United States Patent
Kawagoshi

(10) Patent No.: US 7,358,794 B2
(45) Date of Patent: Apr. 15, 2008

(54) POWER SUPPLY CIRCUIT

(75) Inventor: Hirokazu Kawagoshi, Shiga (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 98 days.

(21) Appl. No.: 11/045,374

(22) Filed: Jan. 31, 2005

(65) Prior Publication Data
US 2005/0189984 A1  Sep. 1, 2005

(30) Foreign Application Priority Data
Feb. 27, 2004 (JP) .............................. 2004-053109
Jun. 29, 2004 (JP) .............................. 2004-190575

(51) Int. Cl.
*G05F 1/575* (2006.01)
(52) U.S. Cl. ...................... 327/537; 327/541; 363/60
(58) Field of Classification Search ............... 327/89
See application file for complete search history.

(56) References Cited

U.S. PATENT DOCUMENTS 6,130,829 A * 10/2000 Shin ........................... 363/60
6,157,243 A * 12/2000 Tailliet ....................... 327/536
6,356,499 B1 * 3/2002 Banba et al. ................ 365/226
6,492,862 B2 * 12/2002 Nakahara .................... 327/536
6,741,118 B2 * 5/2004 Uchikoba et al. ........... 327/541
2005/0168263 A1 * 8/2005 Fukuda et al. .............. 327/535
2005/0200400 A1 * 9/2005 Takeuchi .................... 327/536

FOREIGN PATENT DOCUMENTS

JP       2000-166220        6/2000
WO     WO 2005/001938 A1 * 1/2005

* cited by examiner

*Primary Examiner*—Kenneth B. Wells
*Assistant Examiner*—Terry L. Englund
(74) *Attorney, Agent, or Firm*—McGinn IP Law Group, PLLC

(57) ABSTRACT

A power supply circuit includes a charge pump converting voltage and a regulator controlling the converting operation of the charge pump. The charge pump stops the converting operation after a first delay time from when an output of the charge pump goes over a reference level and starts the converting operation after a second delay time longer than the first delay time from when the output of the charge pump goes below the reference level.

18 Claims, 10 Drawing Sheets

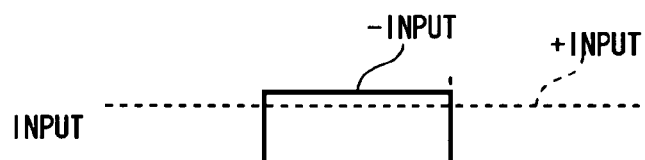
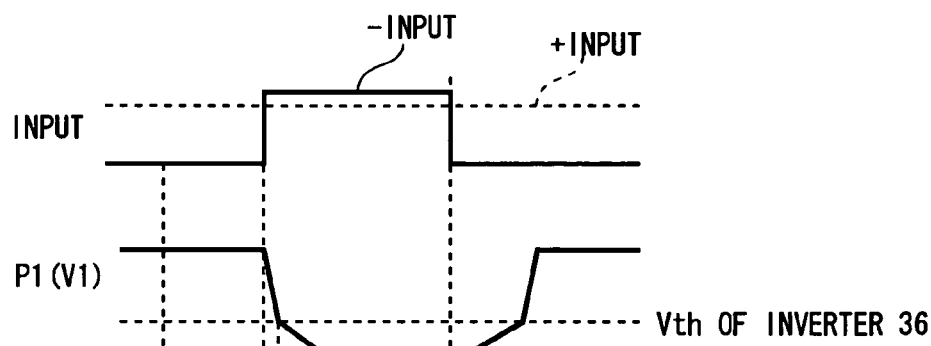
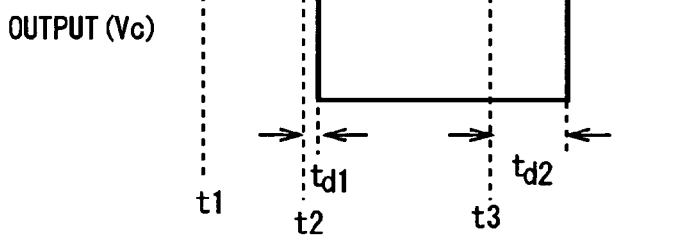
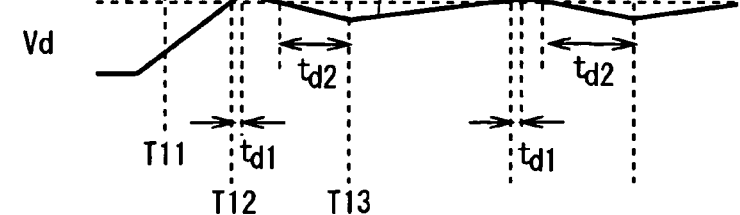

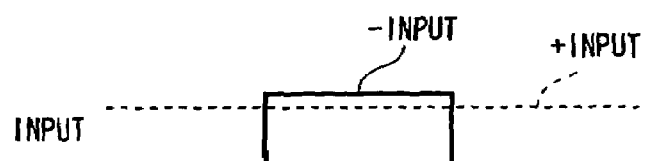
FIG. 8A  INPUT
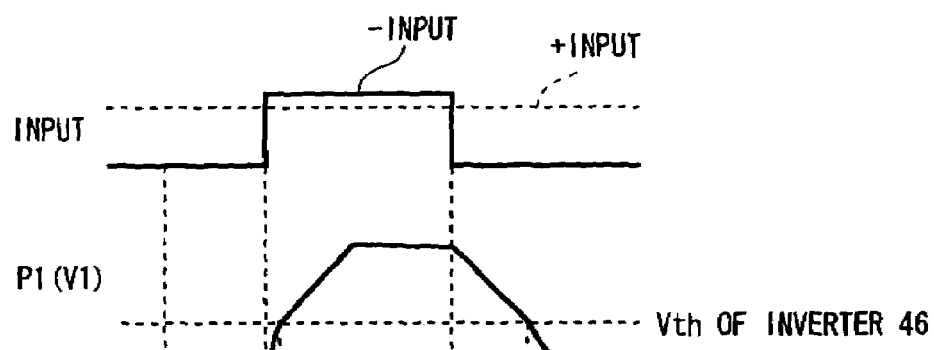
FIG. 8B  P1 (V1)
FIG. 8C  P2 (V2)
FIG. 8D  OUTPUT (Vc)
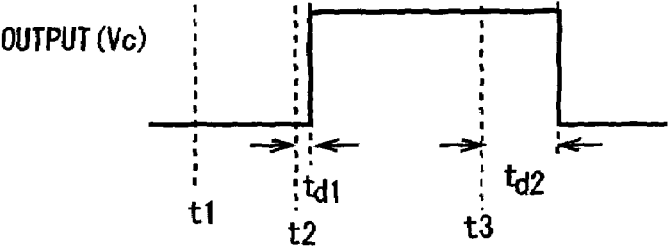
FIG. 9A  CLK1
FIG. 9B  Vc
FIG. 9C  CLK2
FIG. 9D  Vd
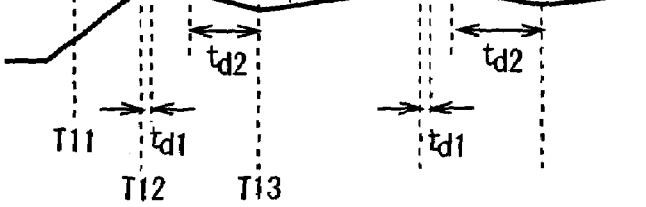

CONVENTIONAL ART

CONVENTIONAL ART
FIG. 13A CLK1
FIG. 13B Vc
FIG. 13C CLK2
FIG. 13D Vd
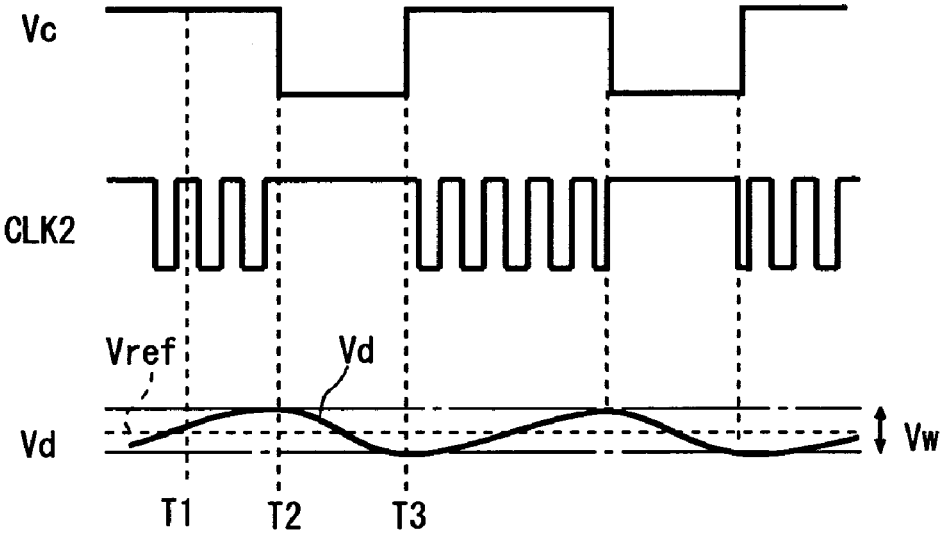

POWER SUPPLY CIRCUIT

BACKGROUND OF THE INVENTION

1. Field of the Invention

The present invention relates to a power supply circuit, and particularly, to a power supply circuit with a charge pump.

2. Description of the Related Art

A conventional power supply circuit stepping up the power supply voltage (refer to Japanese published unexamined patent application 2000-166220, for example), will be described. Referring to FIG. 11, a power supply circuit 100 comprises a charge pump 10 outputting stepped-up voltage by switch operation in synchronization with clock signal CLK1, and a regulator 20 regulating the output of the charge pump 10 by skipping the pulses of the clock signal CLK1 according to the output voltage of the charge pump 10.

As the example in FIG. 12 shows, the charge pump 10 comprises capacitors C1, C2 and the switches SW1, SW2, SW3 and SW4. The switch SW1, capacitor C1 and the switch SW2 are connected in series between VDD and ground terminal Gnd. The switch SW3 is connected between the power supply terminal VDD and the connection points of capacitor C1 and switch SW2. The switch SW4 and capacitor C2 are connected in series between ground terminal Gnd and the connection points of switch SW1 and capacitor C1, and the serial connection point is connected to the output terminal Vout as the output of the charge pump 10. The switches SW1 and SW2 and switches SW3 and SW4 are ON/OFF controlled complementarily by the input clock signal CLK2.

The step-up operation of the charge pump 10 will be described. First, by inputting the "H" level clock signal CLK2, the switches SW1 and SW2 turn ON and the switches SW3 and SW4 turn OFF, and the capacitor C1 is charged by the power supply voltage VDD. Then, by the input of the "L" level clock signal CLK2, the switches SW1 and SW2 turn OFF, the switches SW3 and SW4 turn ON, and the capacitor C2 is charged with voltage being equal to the power supply voltage VDD plus the voltage charged in capacitor C1. By repeating this ON/OFF control, stepped up voltage is output to the output of the charge pump 10. If ON/OFF is controlled such that the charging voltage of capacitors C1 and C2 saturate, the stepped up voltage, which is double that of the power supply voltage VDD, is output to the output of the charge pump 10. In this power supply circuit 100, the pulse of the clock signal CLK2 is skipped (set to "H" level in this example) for a predetermined time so that the recharging voltage of the capacitor C2 does not become saturated, and the step-up operation is stopped by controlling the switches SW3 and SW4 to OFF to output the stepped-up voltage lower than double of the power supply voltage VDD to the output of the charge pump 10.

As FIG. 11 shows, the regulator 20 comprises a voltage dividing circuit 21, comparator 22, reference voltage source 23 and NAND circuit 24. The voltage dividing circuit 21 further comprises the voltage dividing resistors R1 and R2 which are connected in series between the output of the charge pump 10 and the ground terminal Gnd, and outputs the divided voltage Vd from the voltage dividing point Pd. In the comparator 22, the voltage dividing point Pd is connected to the inversion input, and the reference voltage source 23 is connected to the non-inversion input for comparing the divided voltage Vd with the reference voltage Vref, and the comparator output Vc becomes "L" level if the divided voltage Vd is higher than the reference voltage Vref, and becomes "H" level if the divided voltage Vd is lower. The comparator 22 has hysteresis by the peripheral circuit, which is not illustrated, so that the output Vc does not become "H" level or "L" level at a high frequency where the frequency is unstable. In the NAND circuit 24, the clock signal input terminal CLK1 is connected to one input, and the output of the comparator 22 is connected to the other input, the NAND operation is performed on the first clock signal CLK1 from the clock signal input terminal CLK1 and the comparator output Vc, and the result is supplied to the clock input of the charge pump 10 as the second clock signal CLK2.

Now the operation of the power supply circuit 100 with the above configuration will be described with reference to FIGS. 13A-13D. The power supply voltage VDD, such as VDD=3V, is supplied to the power supply terminal VDD by a DC power supply, such as a battery. The clock signal CLK1, such as 10 kHz, is supplied to the clock signal input terminal CLK1, as shown in FIG. 13A. The voltage dividing resistors R1 and R2 of the voltage dividing circuit 21 are set to R1/R2=1, for example, the output potential of the charge pump 10 is divided at the voltage dividing point Pd of the voltage dividing circuit 21, and the divided voltage Vd thereof is compared with the reference voltage Vref, such as Vref=2.5V, by the comparator 22. It is assumed that the comparator 22 has a hysteresis width of Vref±Vw/2. At the time T1, Vd<Vref+Vw/2, as shown in FIG. 13D, and the output voltage Vc of the comparator 22 is "H" level, as shown in FIG. 13B. The NAND operation is performed by the NAND circuit 24 on this "H" level and the clock signal CLK1, and as FIG. 13C shows, the CLK1 bar, which is the clock signal CLK1 is inverted, is output from the NAND circuit 24 as the clock signal CLK2. The charge pump 10 continues the step-up operation in accordance with the input of the clock signal CLK2=CLK1 bar until Vd>Vref+Vw/2 is established, that is until the output terminal voltage Vout exceeds the regulated voltage Vout=Vref×(1+R1/R2)=2.5×(1+1)=5V.

At the time T2, when Vd>Vref+Vw/2 is established, as shown in FIG. 13D, the output voltage Vc of the comparator 22 changes from "H" level to "L" level, as shown in FIG. 13B. The NAND operation is performed in the NAND circuit 24 on this "L" level and the clock signal CLK1, and the pulses of the clock signal CLK1 are skipped and the "H" level is output from the NAND circuit 24 as the clock signal CLK2, as shown in FIG. 13C. The charge pump 10 stops the step-up operation in response to the input of the clock signal CLK2 of "H" level until Vd<Vref−Vw/2 is established, that is until the output terminal voltage Vout becomes lower than the regulated voltage Vout=Vref×(1+R1/R2)=5V.

At the time T3, when Vd<Vref−Vw/2 is established, as shown in FIG. 13D, the output voltage Vc of the comparator 22 is inverted from "L" level to "H" level, as shown in FIG. 13B. By this "H" level, the CLK1 bar, which corresponds to the inverted clock signal CLK1, is output from the NAND circuit 24 as the clock signal CLK2, just like the case of the time T1, and the charge pump 10 continues the step-up operation until Vd>Vref+Vw/2 is established by the input of the clock signal CLK2=CLK1 bar. By repeating these operations, the power supply circuit 100 operates such that the divided voltage Vd comes within the hysteresis of Vref±Vw/2, as shown in FIG. 13D, and the regulated voltage Vout=Vref×(1+R1/R2)=2.5×(1+1)=5V is output to the output terminal Vout.

In the conventional power supply circuit 100, the comparator 22 has hysteresis so that the output Vc of the comparator 22 does not become "H" level or "L" level at a high and unstable frequency. This hysteresis must be sufficient to compensate the high and unstable frequency output from the comparator 22 due to the fluctuation of the load connected to the output terminal Vout. It has now been discovered that, when increasing the hysteresis, however, if the output terminal voltage Vout exceeds the desired value, the comparator 22 stops the step-up operation of the charge pump until the output terminal voltage Vout drops from the desired value by the amount of the hysteresis. As a result, the ripple of the output terminal voltage Vout increases.

SUMMARY OF THE INVENTION

An embodiment of the invention is a power supply circuit comprising a charge pump converting voltage and a regulator controlling the converting operation of the charge pump. The regulator controls the charge pump in such a manner that the charge pump stops the converting operation after first delay time from when an output of the charge pump goes over a reference level and restarts the converting operation after second delay time longer than the first delay time from when the output of the charge pump goes below the reference level. As the regulator controls the charge pump using the first delay time and the second delay time, the high frequency operation of the charge pump can be suppressed, and if the load is relatively light, the increase of operating current consumption can be suppressed without increasing the output ripple very much.

Another embodiment of the invention is a power supply comprising a charge pump converting voltage in accordance with a clock signal and outputting a regulated voltage, and a regulator comprising a comparator comparing the voltage according to an output of the charge pump with a reference voltage. The regulator controls the charge pump in such a manner that the charge pump stops by skipping pulses of the clock signal in response to the comparator output when the voltage goes over the reference voltage and restarts in response to the comparator output when the voltage goes below the reference voltage. The comparator speed is faster when the output state of the comparator changes after the voltage according to the output of the charge pump goes over the reference voltage, and the comparator speed is slower when the output state of the comparator changes after the voltage according to the output of the charge pump goes below the reference voltage.

As changing the comparator speed according to the output of the change pump, the high frequency operation of the charge pump can be suppressed, and if the load is relatively light, the increase of operating current consumption can be suppressed without increasing the output ripple very much.

BRIEF DESCRIPTION OF THE DRAWINGS

The above and other objects, advantages and features of the present invention will be more apparent from the following description taken in conjunction with the accompanying drawings, in which:

FIGS. 3A-3D show a signal waveform diagram depicting the operation of the comparator 32 shown in FIG. 2;

FIGS. 4A-4D show a signal waveform diagram depicting the operation of the power supply circuit 200 shown in FIG. 1;

FIGS. 8A-8D show a signal waveform diagram depicting the operation of the comparator 42 shown in FIG. 7;

FIGS. 9A-9D show a signal waveform diagram depicting the operation of the power supply circuit 300 in FIG. 6;

FIGS. 13A-13D show a signal waveform diagram depicting the operation of the power supply circuit 100 shown in FIG. 11.

DESCRIPTION OF THE PREFERRED EMBODIMENTS

Exemplary embodiments of the present invention will be described with reference to the drawings. The power supply circuits of the embodiments have a charge pump and a regulator controlling the charge pump. The charge pump stops the converting operation after first delay time from when an output of the charge pump goes over a reference level. It restarts the converting operation after second delay time from when the output of the charge pump goes below the reference level. The second delay time is longer than the first delay time.

Figure 1:
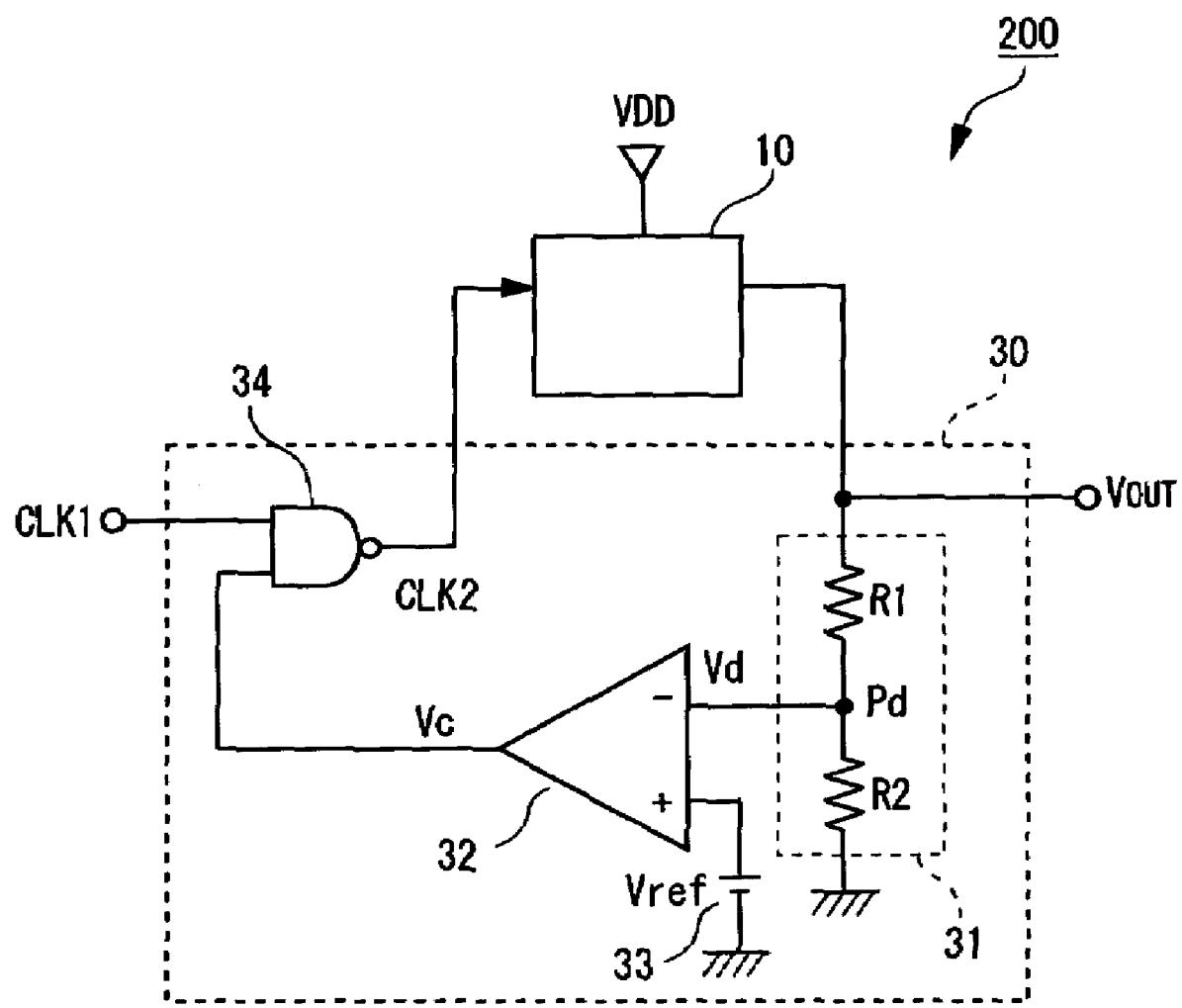
FIG. 1 is a circuit diagram depicting the power supply circuit 200 of an embodiment.
Figure 11:
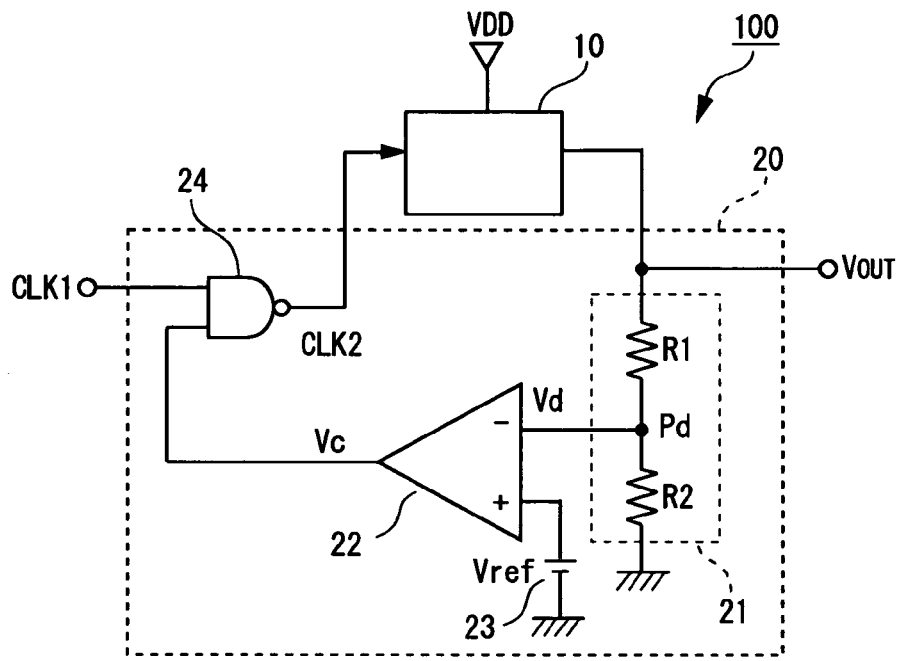
FIG. 11 is a circuit diagram depicting a conventional power supply circuit 100.
Figure 12:
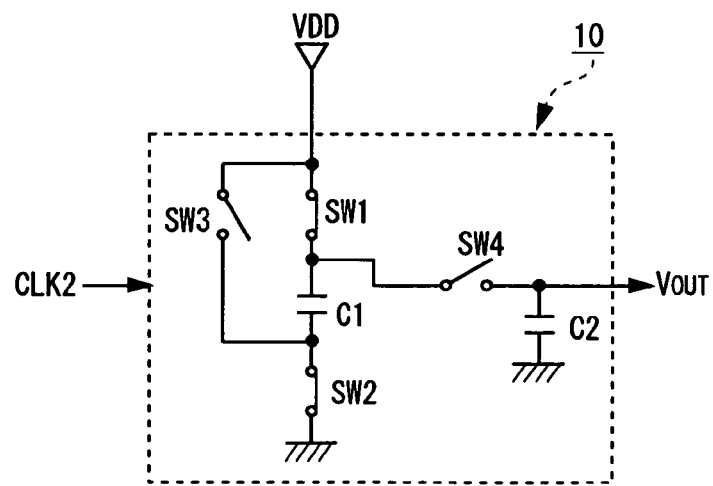
FIG. 12 is a circuit diagram depicting an example of the charge pump 10 to be used for the power supply circuits shown in FIG. 1, FIG. 6 and FIG. 11.

The power supply circuit 200 of an embodiment of the present invention will now be described with reference to FIG. 1. Composing elements the same as FIG. 11 are denoted with the same reference numerals and the overlapped description will be omitted. The power supply circuit 200 comprises a charge pump 10 converting the voltage and a regulator 30 controlling the converting operation of the charge pump 10. The difference from the power supply circuit in FIG. 11 is that the power supply circuit 200 has a regulator 30 instead of the regulator 20.

The regulator 30 comprises a voltage dividing circuit 31, comparator 32, reference voltage source 33 and NAND circuit 34. The voltage dividing circuit 31 is consisted of the voltage dividing resistors R1 and R2 which are connected in series between the output of the charge pump 10 and ground terminal Gnd, and outputs the divided voltage Vd from the voltage dividing point Pd. The comparator 32, where the voltage dividing point Pd is connected to the inversion input and the reference voltage source 33 is connected to the non-inversion input, compares the divided voltage Vd with the reference voltage Vref, and the comparator output Vc is "L" level when the divided voltage Vd is higher than the reference voltage Vref, and is "H" level when it is lower than the reference voltage Vref.

Figure 2:
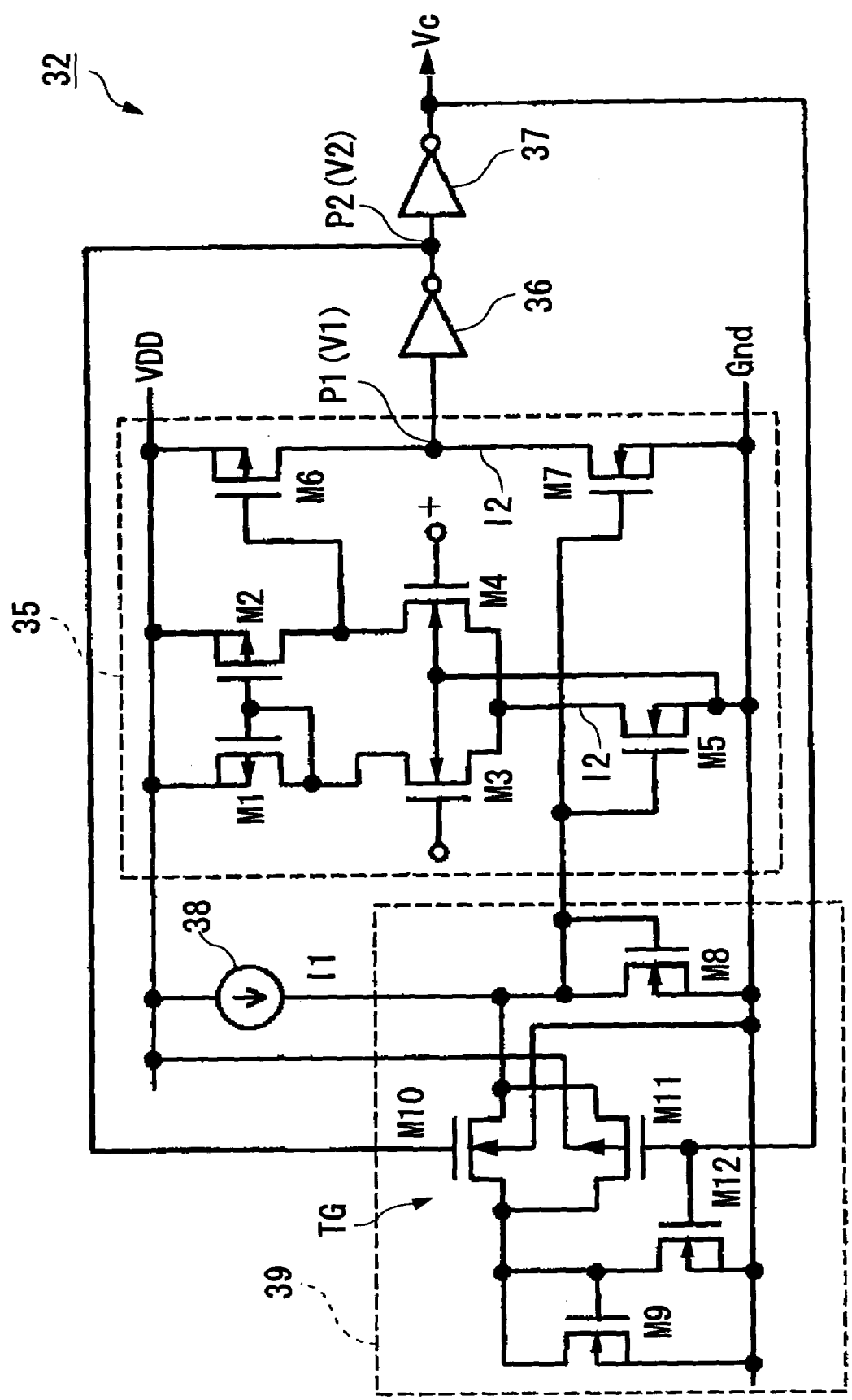
FIG. 2 is a circuit depicting the comparator 32 to be used for the power supply circuit 200 in FIG. 1.

The comparator 32 comprises an operational amplifier 35, inverters 36 and 37, bias current source 38 and bias current control circuit 39, as shown in FIG. 2. The operational amplifier 35 is comprised of a differential amplifier stage which is comprised of P-channel MOS transistors M1 and M2, and N-channel MOS transistors M3-M5, and an output stage which is further comprised of a P-channel MOS transistor M6 and an N-channel MOS transistor M7. The connection point P1 of the MOS transistors M6 and M7 is connected to the inverters 36 and 37, and the inverters 36 and 37 shape the waveform of the potential V1 of the connection point P1, and outputs the "H" and "L" level voltages Vc from the inverter 37. The gates of the MOS transistors M5 and M7 are connected to the bias current control circuit 39, so that the current from the bias current source 38 is controlled by the bias current control circuit 39, and the bias current is supplied to the MOS transistors M5 and M7.

The bias current control circuit 39 comprises an N-channel MOS transistor M8, which is mirror-connected to the MOS transistors M5 and M7 whose drain and source are connected to the bias current source 38 and ground terminal respectively, an N-channel MOS transistor M9 in a diode connection which is mirror-connected to the MOS transistors M5 and M7 by a source being connected to the ground terminal and a drain being connected to the bias current source 38, an N-channel MOS transistor M10 and P-channel MOS transistor M11 constituting a transfer gate TG for connecting the drain of the MOS transistor M9 to the bias current source 38, and an N-channel MOS transistor M12 constituting a pull-down switch for setting the gate of the MOS transistor M9 to the ground potential. The gate of the MOS transistor M10 is connected to the connection point P2 of the inverter 36 and the inverter 37, and the gates of the MOS transistors M11 and M12 are connected to the output of the inverter 37.

The operation of the comparator 32 will be described with reference to FIG. 3. In this example to be described below, it is assumed that the transistor size (W/L=gate width/gate length) is (W/L) of M5=(W/L) of M7=20, (W/L) of M8=10, and (W/L) of M9=30.

(1) At the time t1, as the potential of the − input of the comparator 32 is lower than the potential of the + input, the potential V1 of the connection point P1 is "H" level, the potential V2 of the connection point P2 is "L" level, and the output voltage Vc is "H" level. At this time, in the bias current control circuit 39, the MOS transistors M10 and M11 are in OFF state, the MOS transistor M12 is in ON state, and the bias current is supplied to each of the MOS transistors M5 and M7 mirror-connected with the MOS transistor M8. Therefore the mirror ratio of the MOS transistor M8 and each of the MOS transistors M5 and M7 is 1:2, and if the current to be supplied from the bias current source 38 is I1, then the current I2, to flow into the MOS transistors M5 and M7, is I2=2×I1.

(2) At the time t2, when the potential of the − input of the comparator 32 becomes higher than the potential of the + input, the potential V1 at the connection point P1 starts to drop from the "H" level. The potential V2 at the connection point P2 remains at "L" level until V1 drops to the threshold voltage Vth of the inverter 36, so the output voltage Vc remains in "H" level until then. At this time, in the bias current control circuit 39, the MOS transistors M10 and M11 remain in OFF state and the MOS transistor M12 remains in ON state, and the current I2, to flow into the MOS transistors M5 and M7, remains I2=2×I1. Therefore the delay time td1, from time t2 to the time when the V1 drops to the threshold voltage Vth of the inverter 36, is short, and is td1=0.2 μs, for example.

(3) When the delay time td1 elapses from the time t2, the potential V1 drops below the threshold voltage Vth of the inverter 36, and the potential V2 changes (inverts) from "L" level to "H" level, and the output voltage Vc changes (inverts) from "H" level to "L" level accordingly. At this time, as the potential V2="H" level and the output voltage Vc="L" level, the MOS transistors M10 and M11 become ON state, and the MOS transistor M12 becomes OFF state in the bias current control circuit 39, and bias current is supplied to each of the MOS transistors M5 and M7 mirror-connected with the MOS transistors M8 and M9. Therefore the mirror ratio of the MOS transistors M8 plus M9 and each of the MOS transistors M5 and M7 becomes 2:1, and the current I2, to flow into the MOS transistors M5 and M7, becomes I2=I1/2. Therefore the fall speed of the potential V1 after the delay time td1 elapses from time t2 becomes slower than the fall speed during the delay time td1 from time t2. However at the point when the delay time td1 elapses from the time t2, the output voltage Vc becomes "L" level, so this slow down of the fall speed does not affect the output voltage Vc. Therefore the speed, from the point when the potential of the − input of the comparator 32 becomes higher than that of the + input to the point when the output voltage Vc inverts from "H" level to "L" level, is determined by the delay time td1, and since the delay time td1 is short, this operation is quick.

(4) At the time t3, when the potential of the − input of the comparator 32 becomes lower than that of the + input, the potential V1 at the connection point P1 starts to rise from the "L" level. The potential V2 at the connection point P2 remains in "H" level until V1 rises to the threshold voltage Vth of the inverter 36, therefore the output voltage Vc remains in "L" level until then. At this time, in the bias current control circuit 39, the MOS transistors M10 and M11 remain in ON state, and the MOS transistor M12 remains in OFF state, and the current I2, to flow into the MOS transistors M5 and M7, remains I2=I1/2. Therefore, the delay time td2, which is from the time t3 to the time when V1 rises to the threshold voltage Vth of the inverter 36, becomes longer than when I2=2×I1, such as delay time td 2=0.8 μs, which is about four times longer than delay time td1=0.2 μs.

(5) When the delay time td2 elapses from the time t3, the potential V1 goes over the threshold voltage Vth of the inverter 36, the potential V2 inverts from "H" level to "L" level, and the output voltage Vc inverts from "L" level to "H" level accordingly. At this time, as potential V2="L" level and output voltage Vc="H" level, the MOS transistors M10 and M11 become OFF state and the MOS transistor M12 becomes ON state in the bias current control circuit 39, and bias current is supplied to each of the MOS transistors M5 and M7 mirror-connected with the MOS transistor M8. Therefore the mirror ratio of the MOS transistor M8 and each of the MOS transistors M5 and M7 becomes 1:2, and the current I2, to flow into the MOS transistors M5 and M7, becomes I2=2×1. Therefore the rise speed of the potential V1, after the delay time td2 elapses from the time t3, becomes faster than the rise speed during the delay time td2 from the time t3. Therefore, the speed of the inversion of the output voltage Vc from "L" level to "H" level after the potential of the − input of the comparator 32 becomes lower than that of the + input, is determined by the delay time td2, and since the delay time td2 is longer than the delay time td1, the speed is slower. As described above, the comparator 32 changes the delay time by changing the bias current of the differential amplifier stage. The regulator 30 controls the number of the transistors mirror-connected with the MOS transistors M5 and M7 to change the bias current.

The operation of the power supply circuit 200 with the above configuration will be described with reference to FIG. 4. The power voltage VDD, VDD=3V for example, is supplied to the power supply terminal VDD by a DC power supply such as a battery. The regulator 30 controls the charge pump 10 by controlling the clock input. The clock signal CLK1, 10 kHz for example, is supplied to the clock signal input terminal CLK1, as shown in FIG. 4A. The voltage dividing resistors R1 and R2 of the voltage dividing circuit 31 are set to R1/R2=1, for example, and the output potential of the charge pump 10 is divided at the voltage dividing point Pd of the voltage dividing circuit 31, and the divided voltage Vd thereof is compared with the reference voltage Vref, Vref=2.5V for example, by the comparator 32. At the time T11, Vd<Vref is established, as FIG. 4D shows, and as FIG. 4B shows, the output voltage Vc of the comparator 32 is "H" level. The NAND operation is performed for this "H" level and the clock signal CLK1 by the NAND circuit 34, as FIG. 4C shows. The CLK1 bar, which is the inverted clock signal CLK1, is output from the NAND circuit 34 as the clock signal CLK2. The charge pump 10 continues the step-up operation until the divided voltage Vd exceeds the reference voltage Vref by the input of the clock signal CLK2=CLK1 bar, that is, until the output terminal voltage Vout exceeds the regulated voltage Vout=Vref×(1+R1/R2) =2.5×(1+1)=5V.

At the time T12, as Vd>Vref is established, as shown in FIG. 4D, the output voltage Vc of the comparator 32 inverts from "H" level to "L" level, as shown in FIG. 4B, when the delay time td1 elapses from the time T12. Then the NAND operation is performed on this "L" level and the clock signal CLK1 by the NAND circuit 34, and as FIG. 4C shows, the pulses of the clock signal CLK1 are skipped and "H" level is output for the NAND circuit 34 as the clock signal CLK2. The charge pump 10 stops the step-up operation from the time T12 to the time T13 when the delay time td1+td2 is elapsed in accordance with the input of the clock signal CLK2="H" level.

At the time T13, the comparator 32 outputs "H" level, as shown in FIG. 4B. By this "H" level, just like the case of the time T11, the CLK1 bar, which is the inverted clock signal CLK1, is output from the NAND circuit 34 as the clock signal CLK2, and the charge pump 10 continues the step-up operation until the divided voltage Vd exceeds the reference voltage Vref according to the input of the clock signal CLK2=CLK1 bar. By repeating these operations, the power supply circuit 200 repeats the step-up operation until the divided voltage Vd exceeds the reference voltage Vref and stop of the step-up operation from the time when the divided voltage Vd exceeds the reference voltage Vref to the time when the delay time td2 elapses, as shown in FIG. 4D, so that the regulating voltage Vout=Vref×(1+R1/R2)=2.5×(1+ 1)=5V is output to the output terminal Vout.

In this way the bias of the operational amplifier 35 is controlled by the bias current control circuit 39 according to the output state of the comparator 32, so as to be a high bias at "H" level and to be a low bias at "L" level, so the speed of the comparator 32 becomes fast when the output inverts from "H" level to "L" level, and becomes slow when the output inverts from "L" level to "H" level. As a result, an overshoot of the output terminal voltage Vout can be prevented by stopping fast the step-up operation by the pulse skip when the divided voltage Vd exceeds the reference voltage Vref. Also by returning slowly from the start of the pulse skip to the step-up operation, the high and unstable frequency change of the comparator output between "H" level and "L" level can be suppressed, so that the high frequency operation of the charge pump 10 can be suppressed and the increase of operating current consumption can be suppressed. By appplying the power supply circuit 200 to such a circuit as a portable telephone and a PDA, of which the load is relatively light, the output voltage does not drop from the regulated voltage Vout as much as a power supply circuit comprised of a comparator in which the output terminal voltage Vout has hysteresis at the point of returning to the step-up operation, and the output ripple does not become very big, even if the delay time is relatively long.

Figure 5:
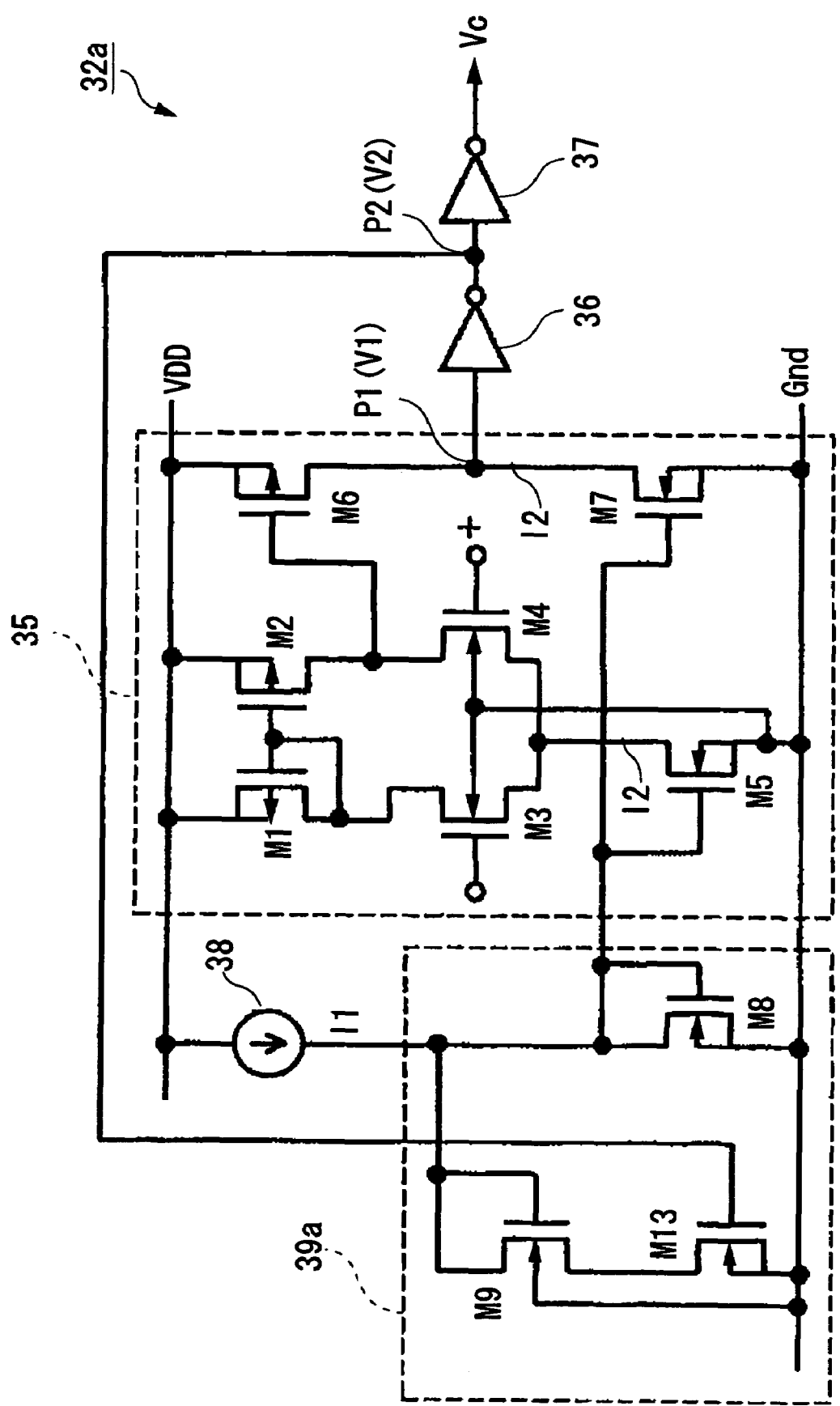
FIG. 5 is another circuit diagram of the comparator 32 to be used for the power supply circuit 200 in FIG. 1.

Now the comparator 32a, which is another example of the comparator 32 to be used for the power supply circuit 200, will be described with reference to FIG. 5. Composing elements the same as those of the comparator 32 in FIG. 2 are denoted with the same reference numerals and the description is omitted. The difference from the comparator 32 in FIG. 2 is that the comparator 32a comprises a bias current control circuit 39a instead of the bias current control circuit 39. The bias current control circuit 39a controls the mirror connection of the MOS transistor M9 to the MOS transistors M5 and M7 of the operational amplifier 35 not by the transfer gate TG but by the MOS transistor, so that the circuit configuration becomes even simpler than the bias current control circuit 39. The bias current control circuit 39a is comprised of an N-channel MOS transistor M8 which is connected to the bias current source 38 and the ground terminal via the drain and source and mirror-connected to the MOS transistors M5 and M7, an N-channel MOS transistor M9 in a diode connection whose drain is connected to the bias current source 38 and which is mirror-connected to the MOS transistors M5 and M7 by the source being connected to the ground terminal, and an N-channel MOS transistor M13 connected with the MOS transistor M9 in series for connecting the source of the MOS transistor M9 to the ground terminal. The gate of the MOS transistor M13 is connected to the connection point P2 of the inverter 36 and the inverter 37.

The operation of the comparator 32a will be described only for the aspects which are different from the comparator 32. When the mirror connection control of the MOS transistor M9 with the MOS transistors M5 and M7 of the operational amplifier 35 is controlled to be OFF, in the bias current control circuit 39a of the comparator 32a, the MOS transistor M13 is controlled to be OFF, while in the bias current control circuit 39 of the comparator 32, the MOS transistors M10 and M11 are controlled to be OFF and the MOS transistor M12 is controlled to be ON. When the mirror connection control of the MOS transistor M9 is controlled to be ON, in the bias current control circuit 39a of the comparator 32a, the MOS transistor M13 is controlled to be ON, while in the bias current control circuit 39 of the comparator 32, the MOS transistors M10 and M11 are controlled to be ON and the MOS transistor M12 is controlled to be OFF.

Figure 6:
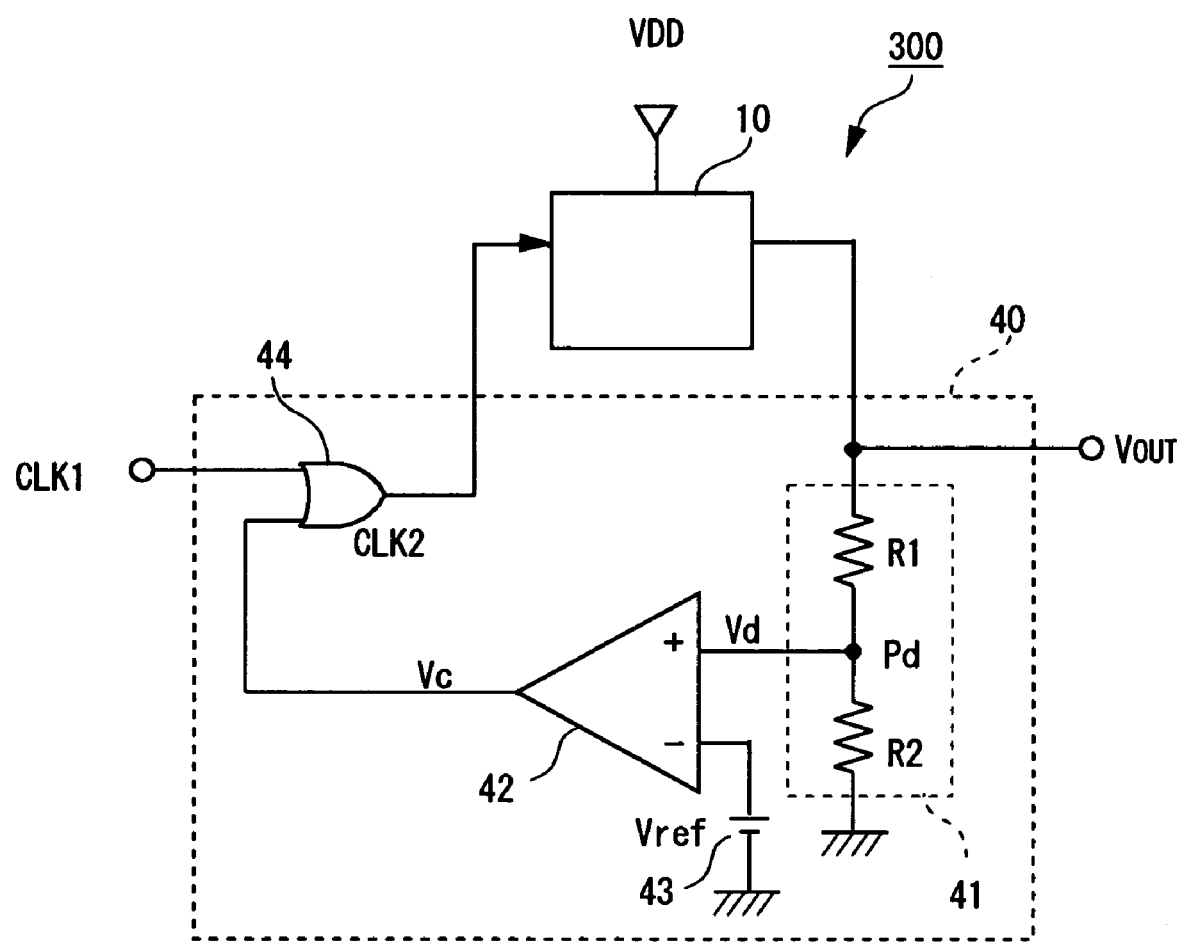
FIG. 6 is a circuit diagram depicting the power supply circuit 300 of another embodiment.

The power supply circuit 300 of another embodiment of the present invention will now be described with reference to FIG. 6. Composing elements the same as FIG. 1 are denoted with the same reference numerals and the description will be omitted. The difference from the power supply circuit 200 of FIG. 1 is that the power supply circuit 300 comprises a regulator 40 instead of the regulator 30. The regulator 40 comprises a voltage dividing circuit 41, comparator 42, reference voltage source 43 and OR circuit 44. The voltage dividing circuit comprised of voltage dividing resistors R1 and R2 which are connected in series between the output of the charge pump 10 and ground terminal Gnd, and outputs the divided voltage Vd from the voltage dividing point Pd. The non-inversion input of the comparator 42 is connected to the voltage dividing point Pd and the inversion input is connected to the reference voltage source 43. The comparator 42 compares the divided voltage Vd with the reference voltage Vref, and the comparator output Vc is "H" level when the divided voltage Vd is higher than the reference voltage Vref, and is "L" level when it is lower than the reference voltage Vref.

Figure 7:
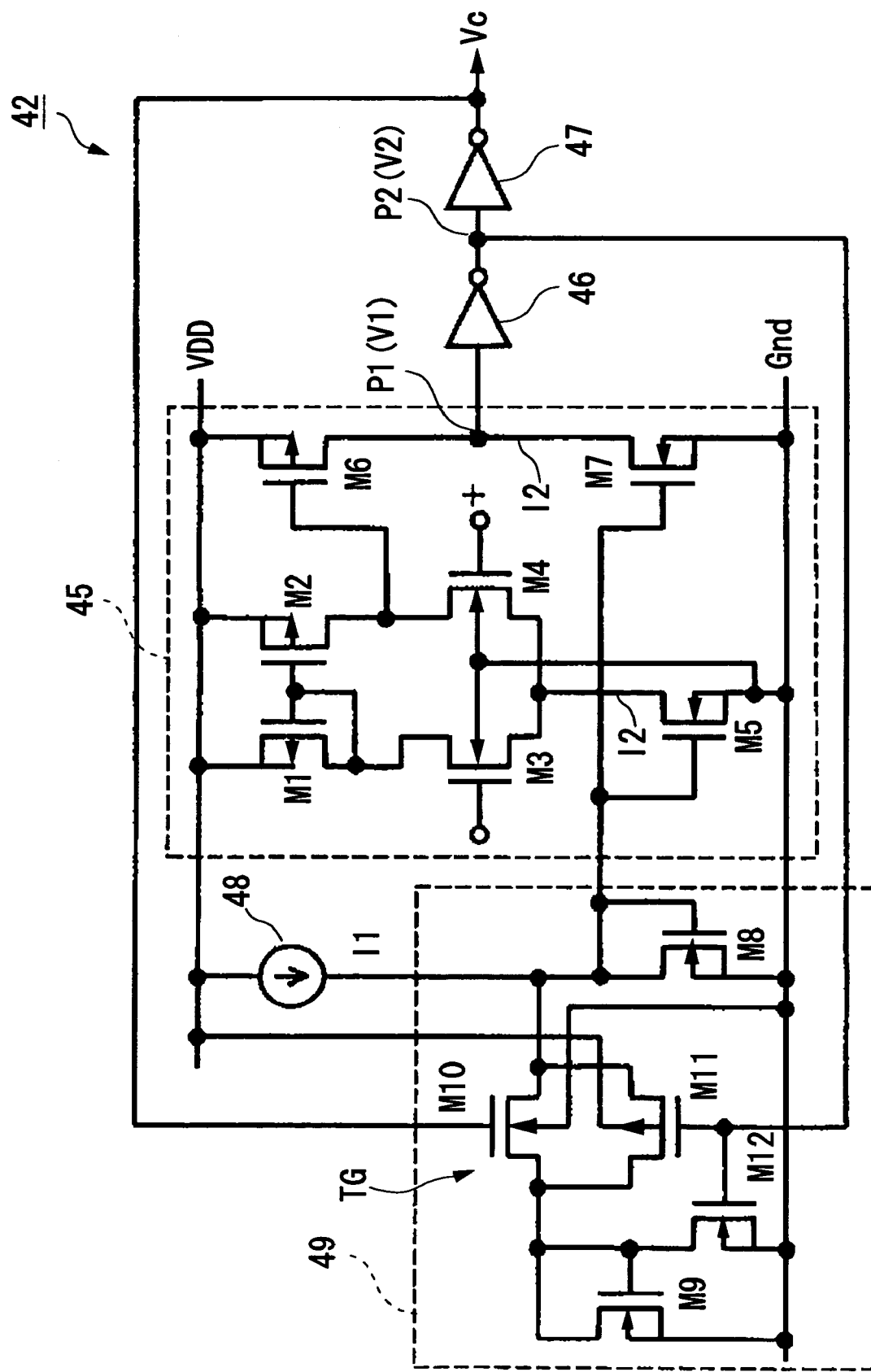
FIG. 7 is a circuit diagram depicting the comparator 42 used for the power supply circuit 300 in FIG. 6.

The comparator 42 comprises an operational amplifier 45, inverters 46 and 47, bias current source 48 and bias current control circuit 49, as shown in FIG. 7. The operational amplifier 45 is comprised of a differential amplification stage which is comprised of the P-channel MOS transistors M1 and M2 and N-channel MOS transistors M3-M5, and an output stage which is comprised of a P-channel MOS transistor M6 and an N-channel MOS transistor M7. The connection point P1 of the MOS transistors M6 and M7 is connected to the inverters 46 and 47, and the inverters 46 and 47 shape the waveform of the potential V1 of the connection point P1 and output the "H" and "L" level voltages Vc from the inverter 47. The gates of the MOS transistors M5 and M7 are connected to the bias current control circuit 49. The current from the bias current source 48 is controlled by the bias current control circuit 49, and the bias current is supplied to the MOS transistors M5 and M7.

The bias current control circuit 49 comprises an N-channel MOS transistor M8, which is connected to the bias current source 48 and ground terminal via the drain and source respectively and mirror-connected to the MOS transistors M5 and M7, an N-channel MOS transistor M9 in a diode connection, which is connected to the ground terminal via the source and mirror-connected to the MOS transistors M5 and M7 by the drain being connected to the bias current source 48, an N-channel MOS transistor M10 and P-channel MOS transistor M11 constituting the transfer gate TG for connecting the drain of the MOS transistor M9 to the bias current source 48, and an N-channel MOS transistor M12 constituting a pull-down switch for setting the gate of the MOS transistor M9 to the ground potential. The gate of the MOS transistor M10 is connected to the output of the inverter 47, and the gates of the MOS transistors M11 and M12 are connected to the connection point P2 of the inverter 46 and the inverter 47.

The operation of the comparator 42 will be described with reference to FIGS. 8A-8D. In this example to be described below, it is assumed that the transistor size (W/L=gate width/gate length) is (W/L) of M5=(W/L) of M7=20, (W/L) of M8=10 and (W/L) of M9=30.

(1) At the time t1, as the potential of the + input of the comparator 42 is lower than the potential of the − input, the potential V1 of the connection point P1 is "L" level, the potential V2 of the connection point P2 is "H" level and the output voltage Vc is "L" level. At this time, in the bias current control circuit 49, the MOS transistors M10 and M11 are in OFF state, the MOS transistor M12 is in ON state, and the MOS transistor M8 is mirror-connected and the bias current is supplied to each of the MOS transistors M5 and M7. Therefore the mirror ratio of the MOS transistor M8 and each of the MOS transistors M5 and M7 is 1:2, and if the current to be supplied from the bias current source 48 is I1, then the current I2, to flow into the MOS transistors M5 and M7, becomes I2=2×I1.

(2) At the time t2, the potential of the + input of the comparator 42 becomes higher than the potential of the − input, and the potential V1 at the connection point P1 starts to rise from the "L" level. The potential V2 at the connection point P2 remains in "H" level until V1 rises to the threshold voltage Vth of the inverter 46, so the output voltage Vc remains in "L" level. At this time, in the bias current control circuit 49, the MOS transistors M10 and M11 remain in OFF state, and the MOS transistor M12 remains in ON state, and the current I2, to flow into the MOS transistors M5 and M7, remains I2=2×I1. Therefore the delay time td1, from the time t2 to the time when V1 rises to the threshold voltage Vth of the inverter 46, is short, and td1=0.2 μs, for example.

(3) When the delay time td1 elapses from the time t2, the potential V1 rises over the threshold voltage Vth of the inverter 46 and the potential V2 inverts from "H" level to "L" level, and the output voltage Vc inverts from "L" level to "H" level accordingly. At this time, as the potential V2="L" level and the output voltage Vc "H" level, the MOS transistors M10 and M11 become ON state and the MOS transistor M12 becomes OFF state in the bias current control circuit 49, each of the MOS transistors M5 and M7 is mirror-connected with the MOS transistors M8 and M9 and bias current is supplied. Therefore the mirror ratio of the MOS transistors M8 and M9 and each of the MOS transistors M5 and M7 become 2:1, and the current I2, to flow into the MOS transistors M5 and M7, becomes I2=I1/2. Therefore the rise speed of the potential V1, after the delay time td1 elapses from the time t2, becomes slower than the rise speed during the delay time td1 from the time t2. At the point when the delay time td1 elapsed from the time t2, however, the output voltage Vc becomes "H" level, so this slow down of the rise speed does not affect the output voltage Vc. Therefore the speed from the point when the potential of the + input of the comparator 42 becomes higher than that of the − input to the point when the output voltage Vc inverts from "L" level to "H" level is determined by the delay time td1, and since the delay time td1 is short, this operation is quick.

(4) At the time t3 when the potential of the + input of the comparator 42 becomes lower than that of the − input, the potential V1 at the connection point P1 starts to drop from the "H" level. The potential V2 at the connection point P2 remains in "L" level until V1 drops to the threshold voltage Vth of the inverter 46, therefore the output voltage Vc remains in "H" level until then. At this time, in the bias current control circuit 49, the MOS transistors M10 and M11 remain in ON state, the MOS transistor M12 remains in OFF state, and the current I2, to flow into the MOS transistors M5 and M7, remains I2=I1/2. Therefore, the delay time td2, which is from the time t3 to the time when the V1 drops to the threshold voltage Vth of the inverter 46, becomes longer than when I2=2×1, such as delay time td2=0.8 μs, which is about four times longer than delay time td1=0.2 μs.

(5) When the delay time td2 elapses from the time t3, the potential V1 below from the threshold voltage Vth of the inverter 46, the potential V2 inverts from "L" level to "H" level, and the output voltage Vc inverts from "H" level to "L" level accordingly. At this time, as potential V2="H" level and output voltage Vc="L" level, the MOS transistors M10 and M11 become OFF state and the MOS transistor M12 becomes ON state in the bias current control circuit 49, and each of the MOS transistors M5 and M7 is mirror-connected with the MOS transistor M8, and bias current is supplied. Therefore, the mirror ratio of the MOS transistor M8 and each of the MOS transistors M5 and M7 becomes 1:2, and the current, to flow into the MOS transistors M5 and M7, becomes I2=2×I1. Therefore the fall speed of the potential V1, after the delay time td2 elapses from the time t3, becomes faster than the rise speed during the delay time td2 from time t3. Therefore, the speed of the inversion of the output voltage Vc from "H" level to "L" level after the potential of the + input of the comparator 42 becomes lower than that of the − input is determined by the delay time td2, and since the delay time td2 is long, the speed is slow.

The operation of the power supply circuit 300 with the above configuration will be described with reference to FIGS. 9A-9D. The power supply voltage VDD, VDD=3V for example, is supplied to the power supply terminal VDD by a DC power supply such as a battery. The CLK1 bar, which is the inversion signal of the clock signal CLK1, is supplied to the clock signal input terminal CLK1 bar as shown in FIG. 9A. The voltage dividing registers R1 and R2 of the voltage dividing circuit 41 are set to R1/R2=1, for example, and the output potential of the charge pump 10 is divided at the voltage dividing point Pd of the voltage dividing circuit 41, and the divided voltage Vd thereof is compared with the reference voltage Vref, Vref=2.5V for example, by the comparator 42. At the time T11, Vd<Vref is established as FIG. 9D shows, and as FIG. 9B shows, the output voltage Vc of the comparator 42 is "L" level. The OR operation is performed for this "L" level and the clock signal CLK1 by the OR circuit 44, and as FIG. 9C shows, the clock signal CLK1 is directly output from the OR circuit 44 as the clock signal CLK2. The charge pump 10 continues the step-up operation until the divided voltage Vd exceeds the reference voltage Vref by the input of the clock signal CLK2=CLK1, that is, until the output terminal voltage Vout exceeds the regulated voltage Vout=Vref×(1+R1/R2)=2.5× (1+1)=5V.

At the time T12 when Vd>Vref is established, as shown in FIG. 9D, the output voltage Vc of the comparator 42 inverts from "L" level to "H" level, as shown in FIG. 9B, when the delay time td1 elapses from the time T12. Then the OR operation is performed for this "H" level and the clock signal CLK1 bar by the OR circuit 44, and as FIG. 9C shows, the pulses of the clock signal CLK1 are skipped and "H" level is output as the clock signal CLK2 from the OR circuit 44. The charge pump 10 stops the step-up operation from the time T12 to the time T13 when the delay time td1+td2 elapsed by the input of the clock signal CLK2="H" level.

At the time T13, the comparator 42 outputs "L" level, as shown in FIG. 9B. By this "L" level, just like the case of the time T11, the clock signal CLK1 is directly output from the OR circuit 44 as the clock signal CLK2, and the charge pump 10 continues the step-up operation by the input of the clock signal CLK2=CLK1 until the divided voltage Vd exceeds the reference voltage Vref. By repeating these operations, the power supply circuit 300 repeats the step-up operation which is performed until the divided voltage Vd exceeds the reference voltage Vref and the stop of the step-up operation which is from the time when the divided voltage Vd exceeds the reference voltage Vref to the time when the delay time td2 elapses, as shown in FIG. 9D, so that the regulated voltage Vout=Vref×(1+R1/R2)=2.5×(1+1) =5V is output to the output terminal Vout.

In this way, the bias of the operational amplifier 45 is controlled by the bias current control circuit 49 according to the output of the comparator 42, so as to be a high bias at "L" level and a low bias at "H" level, so the speed of the comparator 42 becomes fast when the output inverts from "L" level to "H" level, and becomes slow when the output inverts from "H" level to "L" level. As a result, an overshoot of the output terminal voltage Vout can be prevented by stopping fast the step-up operation by the pulse skip, when the divided voltage Vd exceeded the reference voltage Vref. Also by slowing down the return from the start of the pulse skip to step-up operation, the high and unstable frequency change of the comparator 42 output between "H" level and "L" level can be suppressed, so a high frequency operation of the charge pump 10 can be suppressed. By applying this power supply circuit 300 to such circuits as portable telephones and PDA, of which the load is relatively light, the output voltage does not drop from the regulated voltage Vout as much as the power supply circuit comprised of a comparator in which the output terminal voltage Vout has hysteresis at the point of returning to the step-up operation, and the output ripple does not become very big even if the delay time is relatively long. The embodiment is especially suitable for such applications as portable telephones and PDAs of which the load is relatively light.

Figure 10:
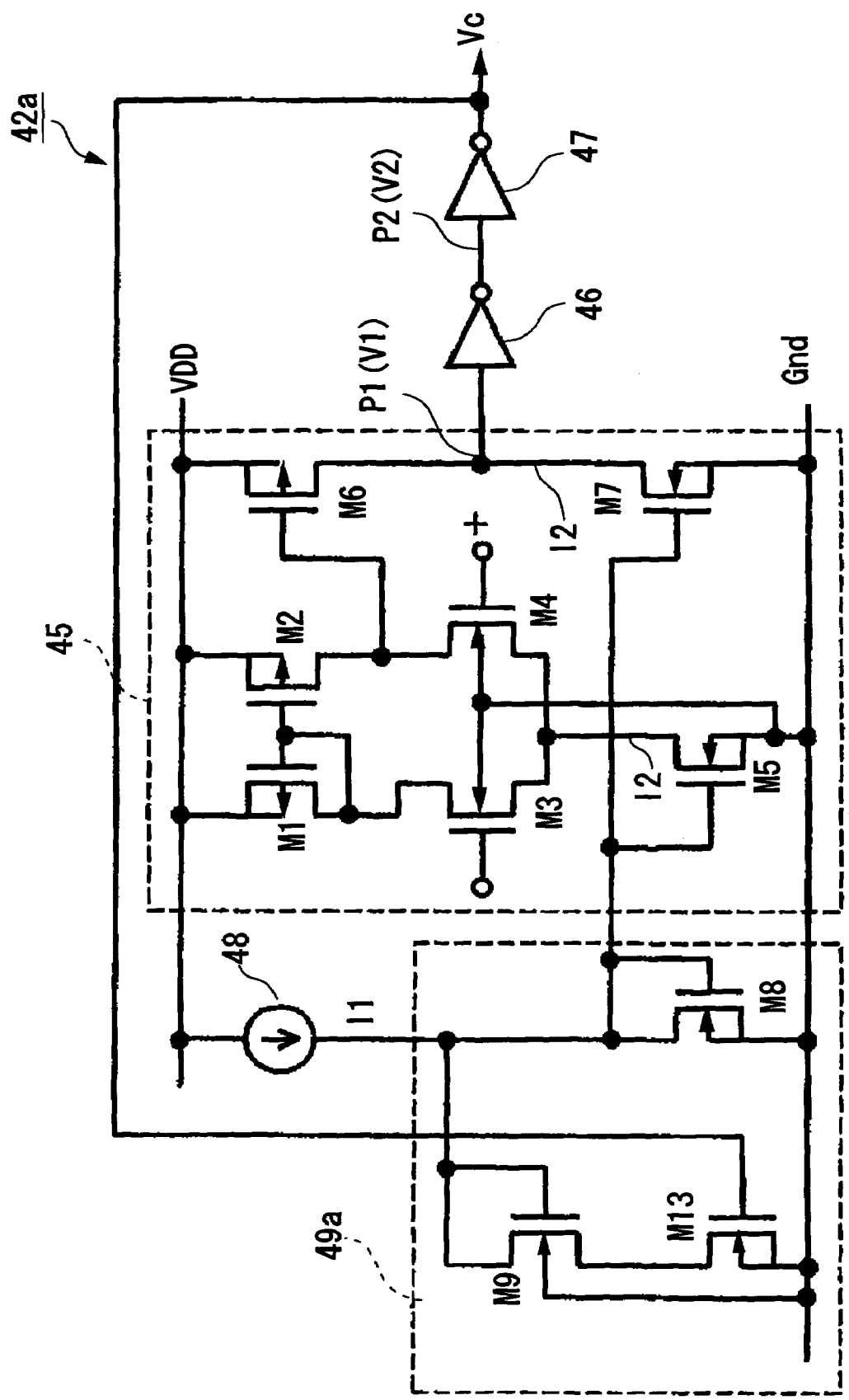
FIG. 10 is another circuit diagram depicting the comparator 42 to be used for the power supply circuit 300 in FIG. 6.

Next, the comparator 42a, which is another example of the comparator 42 to be used for the power supply circuit 300, will be described with reference to FIG. 10. Composing elements the same as those of the comparator 42 in FIG. 7 are denoted with the same reference numerals of which description is omitted. The difference from the comparator 42 in FIG. 7 is that the comparator 42a comprises a bias current control circuit 49a instead of the bias current control circuit 49. The bias current control circuit 49a controls the mirror connection of the MOS transistor M9 to the MOS transistors M5 and M7 of the operational amplifier 45 and not by the transfer gate TG but by the MOS transistor so that the circuit configuration becomes even simpler than the bias current control circuit 49. The bias current control circuit 49a is comprised of an N-channel MOS transistor M8 which is mirror-connected to the MOS transistors M5 and M7 by being connected to the bias current source 48 and ground terminal via the drain and source, an N-channel MOS transistor M9 in a diode connection which is mirror-connected to the MOS transistors M5 and M7 by the drain being connected to the bias current source 48 and the source being connected to the ground terminal, and an N-channel MOS transistor M13 connected in series with the MOS transistor M9 for connecting the source of the MOS transistor M9 to the ground terminal. The gate of the MOS transistor M13 is connected to the output of the inverter 47.

The operation of the comparator 42a will be described only for the aspects which are different from the comparator 42. When the mirror connection control of the MOS transistor M9 with the MOS transistors M5 and M7 of the operational amplifiers 45 is controlled to be OFF, in the bias current control circuit 49a of the comparator 42a, the MOS transistor M13 is controlled to be OFF, while in the bias current control circuit 49 of the comparator 42, the MOS transistors M10 and M11 are controlled to be OFF, and the MOS transistor M12 is controlled to be ON. When the mirror connection control of the MOS transistor M9 is controlled to be ON, in the bias current control circuit 49a of the comparator 42a, the MOS transistor M13 is controlled to be ON, while in the bias current control circuit 49 of the comparator 42, the MOS transistors M10 and M11 are controlled to be ON and the MOS transistor M12 is controlled to be OFF.

It is apparent that the present invention is not limited to the above embodiment and it may be modified and changed without departing from the scope and spirit of the invention. For example, in the above embodiments, the regulators 30, 40 may use other circuit configurations other than the comparator with different speeds to have different time period for stop and restart of the charge pump 10. The operation by the input of the clock signal CLK2 of the charge pump 10 was described assuming that the switches SW1 and SW2 turn ON and switches SW3 and SW4 turn OFF at "H" level, but the switches SW1 and SW2 may turn ON and the switches SW3 and SW4 may turn OFF at "L"

level. In this case, not the NAND circuit 34 but the AND circuit is used for the first embodiment, and not the OR circuit 44 but the NOR circuit is used for the second embodiment. Also in the above Embodiments 1 and 2, the charge pump was described using a double step-up type as an example, but the present invention can also be applied to an integer multiple step-up type charge pump. Also a step-up type was described as an example, but the present invention can also be applied to a step-down type. Also a positive step-up type was described as an example, but the present invention can also be applied to a negative step-up type.

What is claimed is:

1. A power supply circuit comprising:
   a charge pump that converts voltage; and
   a regulator controlling the voltage converting operation of the charge pump by stopping the converting operation after a first delay time, from when an output of the charge pump goes over a reference level, and starting the converting operation after a second delay time, longer than the first delay time, from when the output of the charge pump goes below the reference level,
   wherein the regulator controls the charge pump in accordance with an output state of a comparator and selectively controls;
   a bias current of the comparator by changing a number of transistors mirror-connected to a transistor controlling said bias current of said comparator.

2. The power supply circuit of claim 1, wherein the charge pump converts the voltage in accordance with a clock signal, and the regulator controls the converting operation of the charge pump by controlling an input of the clock signal to the charge pump.

3. The power supply circuit of claim 2, wherein the regulator controls the input of the clock signal to the charge pump in accordance with the output state of the comparator such that a time for the output state of the comparator to change after the output of the charge pump goes over the reference level is shorter than the time for the output state of the comparator to change after the output of the charge pump goes below the reference level.

4. The power supply circuit of claim 3, wherein the regulator controls the bias current of a differential amplifier stage in the comparator to control the time for the output state of the comparator to change.

5. The power supply circuit of claim 1, wherein the regulator changes the number of transistors mirror-connected by controlling a transistor connected in series with a transistor to be mirror-connected to the transistor controlling the bias current.

6. The power supply circuit of claim 1, wherein the regulator control of the charge pump is such that a high frequency operation of the charge pump can be suppressed.

7. The power supply circuit of claim 6, wherein the regulator control of the charge pump is such that operating current consumption can be suppressed without an increase in an output ripple.

8. A power supply circuit comprising:
   a charge pump converting voltage in accordance with a clock signal and outputting a regulated voltage; and
   a regulator comprising a comparator comparing a voltage, according to an output of the charge pump, with a reference voltage and controlling the charge pump to stop converting voltage by skipping pulses of the clock signal in response to a comparator output after the voltage output of the charge pump goes over the reference voltage, and restarts converting voltage in response to the comparator output after the voltage output of the charge pump goes below the reference voltage,
   wherein the comparator speed is faster when an output state of the comparator changes after the voltage, according to the output of the charge pump, goes over the reference voltage, and the comparator speed is slower when the output state of the comparator changes after the voltage, according to the output of the charge pump, goes below the reference voltage, said comparator speed selectively controlled by changing a number of transistors mirror-connected to a transistor controlling a bias current of said comparator.

9. The power supply circuit of claim 8, wherein the comparator comprises an operational amplifier, an inverter shaping an output waveform of the operational amplifier to output a digitized voltage, a bias current source supplying the bias current to the operational amplifier and a bias current controlling circuit controlling the bias current, the operational amplifier is provided with a high bias current for the faster comparator speed and a low bias current for the slower comparator speed.

10. The power supply circuit of claim 9, wherein the operational amplifier comprises a MOS transistor provided with the bias current, and the bias current controlling circuit comprises a first transistor mirror-connected with the MOS transistor of the operational amplifier, a second MOS transistor mirror-connected with the MOS transistor of the operational amplifier for the low bias current and a switch element controlling ON/OFF of the mirror-connection of the second MOS transistor.

11. The power supply circuit of claim 10, wherein the switch element is controlled by an output of the inverter.

12. The power supply circuit of claim 8, wherein the regulator control of the charge pump is such that a high frequency operation of the charge pump can be suppressed.

13. The power supply circuit of claim 12, wherein the regulator control of the charge pump is such that operating current consumption can be suppressed without an increase in an output ripple.

14. A power supply comprising:
    means for converting a voltage; and
    means for controlling the voltage converting operation of the means for converting by stopping the converting operation after a first delay time from when an output of the means for converting goes over a reference level, and restarting the converting operation after a second delay time, longer than the first delay time, from when the output of the means for converting goes below the reference level,
    wherein the means for controlling controls the means for converting in accordance with an output state of a comparator and controls a bias current of the comparator by changing a number of transistors mirror-connected to a transistor controlling said bias current of said comparator.

15. The power supply of claim 14, wherein the means for converting converts the voltage in accordance with a clock signal, and the means for controlling controls the converting operation of the means for converting by controlling input of the clock signal to the means for converting.

16. The power supply of claim 15, wherein the means for controlling controls the input of the clock signal to the means for converting in accordance with the output state of the comparator such that a time for the output state of the comparator to change after the output of the means for converting goes over the reference level is shorter than the time for the output state of the comparator to change after the output of the means for converting goes below the reference level.

17. The power supply of claim 16, wherein the means for controlling controls the bias current of a differential amplifier stage in the comparator to control the time for the output state of the comparator to change.

18. The power supply of claim 14, wherein the means for controlling changes the number of transistors mirror-connected by controlling a transistor connected in series with a transistor to be mirror-connected to the transistor controlling the bias current.

* * * * *